United States Patent [19]

Daniel et al.

[11] Patent Number: 4,965,772
[45] Date of Patent: Oct. 23, 1990

[54] METHOD AND APPARATUS FOR COMMUNICATION NETWORK ALERT MESSAGE CONSTRUCTION

[75] Inventors: Arthur A. Daniel, Rochester, Minn.; Robert E. Moore, Durham, N.C.; Catherine J. Anderson, Raleigh, NC; Thomas J. Gelm, Raleigh, NC; Raymond F. Kiter, Poughkeepsie, NY; John P. Meeham, Raleigh, NC; John G. Slevenson, Raleigh, NC; Lawrence E. Troan, Raleigh, NC.

[73] Assignee: International Business Machines Corporation, Armonk, N.Y.

[21] Appl. No.: 63,618

[22] Filed: Jun. 15, 1987

[51] Int. Cl.$^5$ .............................. G06F 15/403
[52] U.S. Cl. ................... 364/900; 364/120; 364/948.2
[58] Field of Search ... 304/200 MS File, 900 MS File; 371/29; 370/60, 104, 93; 340/825.5, 715; 358/257; 455/8.9

[56] References Cited

U.S. PATENT DOCUMENTS

| | | | |
|---|---|---|---|
| 4,058,672 | 11/1977 | Crager et al. | 178/3 |
| 4,365,315 | 12/1982 | Jamnik | 364/900 |
| 4,464,543 | 8/1984 | Kline et al. | 340/734 |
| 4,481,577 | 11/1984 | Forson | 364/200 |
| 4,525,830 | 6/1985 | Cohen et al. | 370/60 |
| 4,566,078 | 1/1986 | Crabtree | 364/900 |
| 4,592,053 | 5/1986 | Matsuura | 364/200 |
| 4,692,946 | 9/1987 | Andreasen et al. | 364/200 |
| 4,727,366 | 2/1988 | Bourbonnais et al. | 340/748 |
| 4,754,326 | 6/1988 | Kram et al. | 364/900 |
| 4,761,542 | 8/1988 | Kubo et al. | 360/12 |

OTHER PUBLICATIONS

K. Hawley et al., "Multiple Language Display for Terminals", IBM Technical Disclosure Bulletin, vol. 18, No. 8 (Jan., 1976).
Vol. 26, No. 12, IBM Technical Disclosure Bulletin, May, 1984, pp. 6385-6386, "IBM System/38 Alerts", authors Dickes, Fields, Fosdick, Proulx and Tappon.
IEEE INFOCOM '86, IBM Research Triangle Park, Robert E. Moore, pp. 377-381, "Problem Detection, Isolation and Notification in Systems Network Architecture".

Primary Examiner—Raulfe B. Zache
Attorney, Agent, or Firm—Bradley A. Forrest; Roy W. Truelson

[57] ABSTRACT

The construction and display of operator messages representative of alert conditions in a network is described. Code points, which are strings of bits, are generated in response to an event in a device attached to the network. The code points are used to index predefined tables that contain relatively short units of text messages in operator selectable languages to be used in building an operator's information display. A product attached to a network, an alert sender, will generate a series of code points representative of desired display messages for an operator. The messages are indepedent of the specific alert sending product insofar as an alert receiver is concerned. The operator can also choose between detailed and general display messages. The code points are hierarchically arranged so that if the alert receiver does not have the most up to date set of messages, the alert receiver will display a more generic message which is still representative of the event.

14 Claims, 23 Drawing Sheets

| | |
|---|---|
| THE ALERT TYPE (FROM 'X 92' SUBVECTOR) | 301 |
| THE ALERT DESCRIPTION CODE (FROM X'92' SUBVECTOR) | 302 |
| ALL PROBABLE CAUSES CODE POINTS, (IN ORDER) (FROM X'93' SUBVECTOR) | 303 |
| THE DELIMITER X'FFFF' | 304 |
| ALL USER CAUSES CODE POINTS, IN ORDER (FROM X'94' SUBVECTOR)-(OPTIONAL) | 305 |
| THE DELIMITER X'FFFF' | 306 |
| ALL INSTALL CAUSES CODE POINTS, IN ORDER (FROM X'95' SUBVECTOR)-(OPTIONAL) | 307 |
| THE DELIMITER X'FFFF' | 308 |
| ALL FAILURE CAUSES CODE POINTS, IN ORDER (FROM X' 96' SUBVECTOR)-(OPTIONAL) | 309 |

FIG. 3A

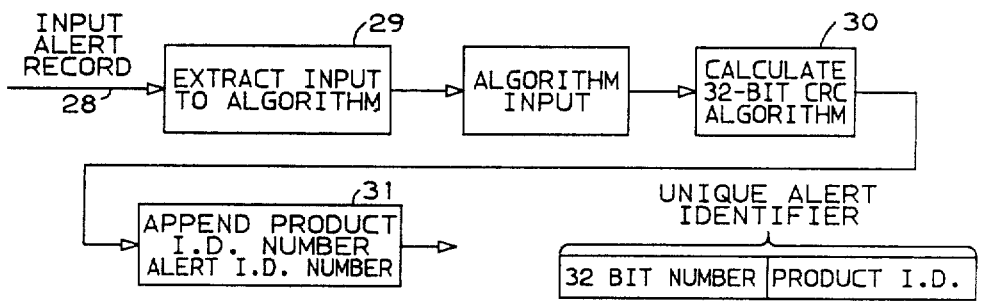

| BYTE | BIT | VALUE | MEANING | |
|---|---|---|---|---|
| 0-2 | | X'41038D' | NMVT | NMVT HEADER |
| 3-4 | | X'0000' | (RETIRED) | |
| 5-6 | | X'0000' | (RESERVED/RETIRED/PRID) | |
| 7 | | B'0' | UNSOLICITED | |
| | | B'00' | ONLY NMVT FOR THIS PRID | |
| | | B'00000' | (RETIRED/RESERVED) | |
| 8-9 | | X'007D' | ALERT MAJOR VECTOR LENGTH | DATE/TIME SUB-VECTOR |
| 10-11 | | X'0000' | ALERT MAJOR VECTOR KEY | |
| 12 | | X'0A' | DATE/TIME SV LENGTH | |
| 13 | | X'01' | DATE/TIME SV KEY | |
| 14 | | X'08' | LOCAL DATE/TIME SF LENGTH | |
| 15 | | X'10' | LOCAL DATE/TIME SF KEY | |
| 16 | | X'yy' | LOCAL DATE:YEAR | |
| 17 | | X'mm' | LOCAL DATE:MONTH | |
| 18 | | X'dd' | LOCAL DATE:DAY | |
| 19 | | X'hh' | LOCAL TIME:HOURS | |
| 20 | | X'mm' | LOCAL TIME:MINUTES | |
| 21 | | X'ss' | LOCAL TIME SECONDS | |

FIG. 6A

| | | | |
|---|---|---|---|
| 22 | | X'19' | PRODUCT SET ID SV LENGTH |
| 23 | | X'10' | PRODUCT SET ID SV KEY |
| 24 | | X'00' | (RETIRED) |
| 25 | | X'16' | PRODUCT ID SV LENGTH |
| 26 | | X'11' | PRODUCT ID SV KEY |
| 27 | | X'01' | (RESERVED)/IBM HARDWARE |
| 28 | | X'13' | HARDWARE PRODUCT ID SF LENGTH |
| 29 | | X'00' | HARDWARE PRODUCT ID SF KEY |
| 30 | | X'12' | FORMAT TYPE |
| 31+34 | | E'TTTT' | EBCDIC MACHINE TYPE |
| 35-37 | | E'MMM' | EBCDIC MACHINE MODEL NUMBER |
| 38-39 | | E'PP' | EBCDIC IBM PLANT OF MANUFACTURE |
| 40-46 | | E'SSSSSSS' | EBCDIC MACHINE SEQUENCE NUMBER |
| 47 | | X'1B' | HIERARCHY/RESOURCE LIST SV LENGTH |
| 48 | | X'05' | HIERARCHY/RESOURCE LIST SV KEY |
| 49 | | X'19' | HIERARCHY NAME LIST SF LENGTH |
| 50 | | X'10' | HIERARCHY NAME LIST SF KEY |
| 51 | | X'80' | FLAG BYTE (HIERARCHY NOT COMPLETE) |
| 52 | | X'09' | LENTH OF HNL ENTRY 1 |
| 53-60 | | E'NNNNNNNN' | LAN NAME |
| 61 | | X'40' | FLAG BYTE (DISPLAY RESOURCE NAME) |
| 62 | | X'39' | RESOURCE TYPE=LAN |
| 63 | | X'09' | LENGTH OF HNL ENTRY 2 |
| 64-71 | | E'NNNNNNNN' | RING NAME |
| 72 | | X'40' | FLAG BYTE (DISPLAY RESOURCE NAME) |
| 73 | | X'2E' | RESOURCE TYPE = TOKEN RING |

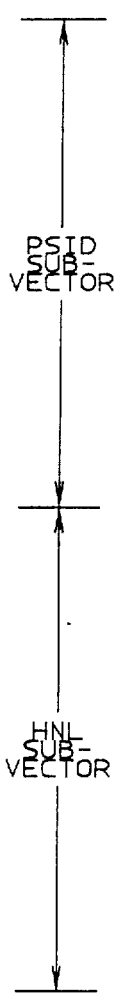

FIG. 6B

| | | | |
|---|---|---|---|
| 74 | | X'0B' | GENERIC ALERT DATA SV LENGTH |
| 75 | | X'92' | GENERIC ALERT DATA SV KEY |
| 76-77 | 0 | B'0' | FLAGS: NOT OPERATOR INITIATED |
| | 1 | B'0' | NOT HELD |
| | 2 | B'0' | NOT DELAYED |
| | 3-15 | B'00..00' | (RESERVED) |
| 78 | | X'01' | ALERT TYPE = PERMANENT |
| 79-80 | | X'3212' | ALERT DESCRIPTION = WIRE FAULT |
| 81-84 | | X'A676 B230' | ALERT ID NUMBER (CALCULATED WITH THE 32-BIT CRC ALGORITHM |
| 85 | | X'04' | PROBABLE CAUSES SV LENGTH |
| 86 | | X'93' | PROBABLE CAUSES SV KEY |
| 87-88 | | X'3702' | PROBABLE CAUSES = TOKEN-RING LOBE |
| 89 | | X'22' | FAILURE CAUSES SV LENGTH |
| 90 | | X'96' | FAILURE CAUSES SV KEY |
| 91 | | X'08' | FAILURE CAUSES SF LENGTH |
| 92 | | X'01' | FAILURE CAUSES SF KEY |
| 93-94 | | X'3711' | FAILURE CAUSES = LOCAL ACCESS UNIT |
| 95-96 | | X'3434' | FAILURE CAUSES = LOCAL LOBE CABLES |
| 97-98 | | X'3320' | FAILURE CAUSES = LOCAL T.-R. ADAPTER |
| 99 | | X'08' | RECOMMENDED ACTIONS SF LENGTH |
| 100 | | X'81' | RECOMMENDED ACTIONS SF KEY |
| 101-102 | | X'2010' | ACTION = REVIEW LINK DETAILED DATA |
| 103-104 | | X'3101' | ACTION = CONTACT T.-R. ADMINISTRATOR RESPONSIBLE FOR THIS LAN |
| 105-106 | | X'32C0' | ACTION = REPORT THE FOLLOWING |

FIG. 6C

| | | | |
|---|---|---|---|
| 107 | | X'07' | DETAILED DATA SF(SUBFIELD)LENGTH |
| 108 | | X'82' | DETAILED DATA SF KEY |
| 109 | | X'21' | PSID (PRODUCT SET I.D.) INDEX = SENDER'S HW (HARDWARE) |
| 110 | | X'61' | DATA ID = ADAPTER NUMBER |
| 111 | | X'11' | DATA ENCODING = EBCDIC (CHAR SET A+) |
| 112-113 | | E'NN' | ADAPTER NUMBER |
| 114 | | X'09' | DETAILED DATA SF LENGTH |
| 115 | | X'82' | DETAILED DATA SF KEY |
| 116 | | X'21' | PSID INDEX = SENDER'S HW |
| 117 | | X'07' | DATA ID = ERROR CODE |
| 118 | | X'00' | DATA ENCODING = HEXADECIMAL |
| 119-122 | | X'CCCC CCCC' | PRODUCT-UNIQUE ERROR CODE |
| 123 | | X'0A' | LAN LCS (LINK CONNECTION SUBSYSTEM) DATA SV LENGTH |
| 124 | | X'51' | LAN LCS DATA SV KEY |
| 125 | | X'08' | LOCAL INDIV. MAC ADDRESS SF LENGTH |
| 126 | | X'03' | LOCAL INDIV. MAC ADDRESS SF KEY |
| 127-132 | | X'aaaaaa aaaaaa' | LOCAL INDIVIDUAL MAC ADDRESS |

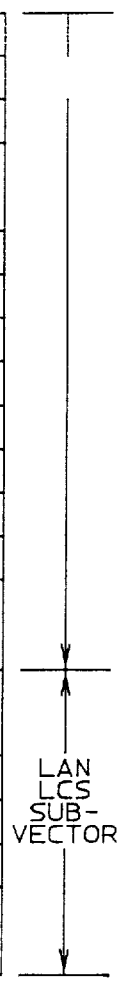

LAN LCS SUB-VECTOR

FIG. 6D

| FIG. 7A |
|---|
| FIG. 7B |
| FIG. 7C |
| FIG. 7D |

FIG. 7

MANAGEMENT SERVICES (MS) MAJOR VECTOR FORMATS

ALERT (X'0000') MS MAJOR VECTOR

> PU T2 → SSCP
>
> THIS MAJOR VECTOR PROVIDES UNSOLICITED NOTIFICATION OF A PROBLEM OR IMPENDING PROBLEM, TYPE OF PROBLEM, IDENTIFICATION OF THE CAUSE, AND IDENTIFICATION OF THE COMPONENT THAT CAUSED THE PROBLEM.

LENGTH (n+1), IN BINARY, OF THIS MS MAJOR VECTOR
KEY: X'0000'
MS SUBVECTORS

| BYTE # | SUBVECTOR NAME | SUBVECTOR HEX ID X'NN' | PRESENCE IN NMVT ALERT (X'0000') MAJOR VECTOR | |
|---|---|---|---|---|
| 0-1 | TEXT MESSAGE | X'00' | O | NOTE 1 |
| 2-3 | DATE/TIME | X'01' | CP | NOTE 2 |
| 4-n | HIERARCHY NAME LIST | X'03' | CP | NOTE 3 |
|  | SNA ADDRESS LIST | X'04' | CP | NOTE 4 |
|  | HIERARCHY/RESOURCE LIST | X'05' | CP | NOTE 5 |
|  | PRODUCT SET ID | X'10' | P(n) | NOTE 6 |
|  | SELF DEFINING TEXT MSG. | X'31' | O |  |
|  | RELATIVE TIME | X'42' | CP | NOTE 7 |

(COMMON SUBVECTORS)

FIG. 7A

| | | | | |
|---|---|---|---|---|
| | LAN LINK CONNECTION SUBSYSTEM DATA | X'51' | CP | NOTE 8 |
| | LCS CONFIGERATION DATA | X'52' | CP | NOTE 9 |
| | SDLC LINK STATION DATA | X'8C' | CP | NOTE 10 |
| | BASIC ALERT | X'91' | O | NOTE 11 |
| | GENERIC ALERT DATA | X'92' | P | |
| | PROBABLE CAUSES | X'93' | P | |
| | USER CAUSES | X'94' | CP | NOTE 12 |
| | INSTALL CAUSES | X'95' | CP | NOTE 12 |
| | FAILURE CAUSES | X'96' | CP | NOTE 12 |
| | CAUSE UNDETERMINED | X'97' | CP | NOTE 13 |
| | DETAILED DATA | X'98' | O | |
| | DETAIL QUALIFIER | X'A0' OR X'A1' | O(n) | NOTE 14 |

} ALERT ID GENERATION INPUT SOURCE SUBVECTORS

KEY:
P    PRESENT ONE TIME
P(n) PRESENT ONE OR MORE TIMES
CP   CONDITIONALLY PRESENT ONE TIME
     (SEE NOTES FOR CONDITIONS.)
O    OPTIONALLY PRESENT ONE TIME
O(n) OPTIONALLY PRESENT ONE OR MORE TIMES

NOTES:

1. THIS SUBVECTOR MAY BE OPTIONALLY INCLUDED BY AN ALERT SENDER, TO TRANSPORT TEXT IN A SINGLE ALERT MAJOR VECTOR THAT CAN BE PROCESSED BY BOTH A PRE-GENERIC ALERT AND A GENERIC ALERT FOCAL POINT. IF THIS SUBVECTOR IS PRESENT, THE X'91' SUBVECTOR MUST ALSO BE PRESENT

FIG. 7B

2. IF THE PU SENDING THE ALERT MAJOR VECTOR HAS THE CAPABILITY OF PROVIDING IT, IT PLACES THIS SUBVECTOR IN THE NMVT. SEE NOTE 7.

3. THIS SUBVECTOR MAY BE OPTIONALLY INCLUDED IN THE NMVT BY AN ALERT SENDER IN ORDER TO CREATE A SINGLE ALERT MAJOR VECTOR THAT CAN BE PROCESSED BY BOTH A PRE-GENERIC ALERT AND A GENERIC ALERT FOCAL POINT. WHEN IT IS PRESENT, THIS SUBVECTOR IDENTIFIES AN ORIGIN OF THE CONDITION THAT IS NOT AN SNA NETWORK ADDRESSABLE UNIT. IF THE SUBVECTOR IS PRESENT, THE X 91 SUBVECTOR MUST ALSO BE PRESENT.

4. THIS SUBVECTOR IS PRESENT WHEN IT IS NECESSARY TO IDENTIFY, WITH AN SNA ADDRESS, THE ORIGIN OF THE ALERT CONDITION. IF THE ORIGIN OF THE ALERT CONDITION IS THE PU SENDING THE ALERT, THIS SUBVECTOR IS NOT PRESENT.

5. THIS SUBVECTOR IS PRESENT IN THE NMVT INSTEAD OF, OR IN ADDITION TO, THE SNA ADDRESS LIST (X'04') SUBVECTOR IF THE ORIGIN (OTHER THAN THE PU SENDING THE ALERT) OF THE ALERT CONDITION CANNOT BE REPRESENTED IN THE SNA ADDRESS LIST (X'04') SUBVECTOR.

6. AN INSTANCE OF THIS SUBVECTOR DESCRIBING THE PU SENDING THE ALERT IS ALWAYS PRESENT. A SECOND INSTANCE IS PRESENT IF THE ORIGIN OF THE ALERT CONDITION IS A HARDWARE OR SOFTWARE PRODUCT, AND IS NOT THE PU SENDING THE ALERT. IF A SECOND INSTANCE IS PRESENT, IT IS PLACED IMMEDIATELY AFTER THE FIRST INSTANCE OF THE (X'10') SUBVECTOR.

IN AN ALERT CONTAINING TWO INSTANCES OF THE PRODUCT SET ID SUBVECTOR, THE FOLLOWING TERMS REFER, RESPECTIVELY, TO THEESE TWO INSTANCES:

- "ALERT SENDER PSID"--IDENTIFIES THE PU SENDING THE ALERT
   - "INDICATED RECOURCE PSID"--IDENTIFIES THE RESOURCE THAT IS BEING ALERTED UPON

IN AN ALERT WITH ONLY ONE INSTANCE OF THE PRODUCT SET ID, THIS INSTANCE IS REFERRED TO BOTH AS THE ALERT SENDER PRODUCT SET ID AND AS THE INDICATED RESOURCE PRODUCT SET ID.

FIG. 7C

7. IF THE PU SENDING THE ALERT CANNOT PROVIDE A DATE/TIME (X'01') SUBVECTOR, IT PLACES THIS SUBVECTOR IN THE NMVT INSTEAD.

8. THIS SUBVECTOR IS PRESENT WHEN THE ALERT REPORTS AN ERROR ON A LAN, AND THE NODE SENDING THE ALERT IS ATTACHED TO THE LAN.

9. THIS SUBVECTOR IS PRESENT WHEN THE ALERT REPORTS A PROBLEM WITH A LOGICAL LINK USING THE SDLC OR LAN LLC PROTOCOL.

10. THIS SUBVECTOR IS PRESENT WHEN THE ALERT REPORTS A PROBLEM WITH A LOGICAL LINK USING THE SDLC OR LAN LLC PROTOCOL.

11. THIS SUBVECTOR MAY BE OPTIONALLY INCLUDED BY AN ALERT SENDER IN ORDER TO CREATE A SINGLE ALERT MAJOR VECTOR THAT CAN BE PROCESSED BY BOTH A PRE-GENERIC ALERT AND A GENERIC ALERT FOCAL POINT.

12. ANY OR ALL OF THESE SUBVECTORS ARE PRESENT IN AN ALERT, DEPENDING ON THE PROBABLE CAUSES OF THE ALERT CONDITION IDENTIFIED BY THE ALERT SENDER.

13. THIS SUBVECTOR IS PRESENT IN AN ALERT IF AND ONLY IF NONE OF THE X'94', X'95', AND X'96' SUBVECTORS ARE PRESENT.

14. UP TO A TOTAL OF THREE INSTANCES OF THESE SUBVECTORS MAY BE OPTIONALLY INCLUDED BY AN ALERT SENDER, IN ORDER TO CREATE A SINGLE ALERT MAJOR VECTOR THAT CAN BE PROCESSED BY BOTH A PRE-GENERIC ALERT AND A GENERIC ALERT FOCAL POINT. IF EITHER OF THESE SUBVECTORS IS PRESENT, THE X'91' SUBVECTOR MUST ALSO BE PRESENT.

FIG. 7D

| FIG. 8A |
|---|
| FIG. 8B |
| FIG. 8C |
| FIG. 8D |

FIG. 8

| GENERIC ALERT DATA (X'92') ALERT MS SUBVECTOR |
|---|
| THIS SUBVECTOR TRANSPORTS ALERT INFORMATION IN THE FORM OF CODE POINTS THAT CORRESPOND TO STRINGS OF TEXT STORED AT THE ALERT RECEIVER. IT ALSO TRANSPORTS AN ALERT ID NUMBER THAT UNIQUELY IDENTIFIES A PARTICULAR ALERT. |

| BYTE # | |
|---|---|
| 0 | LENGTH (P+1), IN BINARY, OF THE GENERIC ALERT DATA SUBVECTOR |
| 1 | KEY: X'92' |
| 2-3 | FLAGS: |
| | BIT 0, INITIATE INDICATOR: |
| |     0 ALERT WAS NOT DIRECTLY INITIATED BY AN OPERATOR ACTION |
| |     1 ALERT WAS INITIATED BY AN OPERATOR ACTION |
| | BIT 1, HELD ALERT INDICATOR: |
| |     0 ALERT WAS SENT WHEN THE PROBLEM WAS DETECTED |
| |     1 ALERT CONDITION WAS DETECTED EARLIER, BUT THE ALERT WAS NOT SHOWN AT THAT TIME BECAUSE THERE WAS NO SESSION AVAILABLE TO SEND IT ON |

FIG. 8A

| | |
|---|---|
| | BIT 2. DELAYED ALERT INDICATOR:<br>    0 SENDER IS NOT REPORTING A PRIVIOUSLY DE-<br>       TECTED ALERT CONDITION THAT PREVENTED RE-<br>       PORTING WHEN DETECTED<br>    1 SENDER IS REPORTING A PREVIOUSLY DETECTED<br>       ALERT CONDITION THAT PREVENTED REPORTING<br>       WHEN DETECTED<br><br>    NOTE: IF THE DELAYED ALERT INDICATOR IS SET<br>        TO 1. THE HELD ALERT INDICATOR MUST<br>        ALSO BE SET TO 1.<br>BITS<br>3-15. RESERVED |
| 4 | ALERT TYPE: A CODE POINT INDICATING THE SEVERITY OF THE ALERT CONDITION.<br><br>DEFINED CODES ARE:<br><br>X'01' PERMANENT LOSS OF AVAILABILITY: A LOSS OF AVAILABILITY TO THE END USER THAT IS NOT RECOVERED FROM WITHOUT INTERVENTION EXTERNAL TO THE REPORTING PRODUCT<br><br>X'02' TEMPORARY LOSS OF AVAILABILITY: A MOMENTARY LOSS OF AVAILABILITY THAT WILL PROBABLY BE NOTIFIED BY THE END USER, YET IS RECOVERED FROM WITHOUT INTERVENTION EXTERNAL TO THE REPORTING PRODUCT<br><br>X'03' PERFORMANCE: PERFORMANCE IS BELOW WHAT IS CONSIDERED AN ACCEPTABLE LEVEL<br><br>X'11' IMPENDING PROBLEM: A LOSS OF AVAILABILITY TO THE END USER IS IMPENDING BUT HAS NOT YET HAPPENED<br><br>X'12' UNKNOWN: IT IS IMPOSSIBLE TO ASSESS THE SEVERITY OF THE ALERT CONDITION |

FIG. 8B

| | |
|---|---|
| 5-6 | ALERT DESCRIPTION CODE: A CODE POINT THAT PROVIDES AN INDEX TO PREDEFINED TEXT DESCRIBING THE ALERT CONDITION. AN ALERT RECIEVER HAS TWO OPTIONS FOR SELECTING TEXT TO DISPLAY. IT CAN DISPLAY THE ENGLISH TEXT DOCUMENTED WITH EACH CODE POINT OR ITS NATIONAL LANGUAGE EQUIVALENT, OR, FOR A PRESENTATION TO AN OPERATOR OF A LOWER SKILL LEVEL, IT CAN CHOOSE THE FOLLOWING SIMPLER TEXT, OR ITS NATIONAL LANGUAGE EQUIVALENT, BASED ONLY ON THE FIRST DIGIT OF THE CODE POINT: <br><br> X'1XXX'  HARDWARE <br> X'2XXX'  SOFTWARE <br> X'3XXX'  COMMUNICATIONS <br> X'4XXX'  PERFORMANCE <br> X'5XXX'  CONGESTION <br> X'6XXX'  MICROCODE <br> X'7XXX'  OPERATOR <br> X'8XXX'  SPECIFICATION <br> X'9XXX'  INTERVENTION REQUIRED <br> X'AXXX'  PROBLEM RESOLVED <br> X'BXXX'  NOTIFICATION <br> X'CXXX'  SECURITY <br> X'FXXX'  UNDETERMINED <br><br> DEFINED CODES ARE: <br>     (OMITTED FOR SIMPLICITY) |

FIG. 8C

| BYTE # | |
|---|---|
| 7-10 (=p) | ALERT ID NUMBER: A FOUR BYTE HEXADECIMAL VALUE COMPUTED AS FOLLOWS: |

STAGE 1: ASSEMBLE (IN ORDER) THE FOLLOWING INPUT FROM THE ALERT MAJOR VECTOR:

- ALERT TYPE
- ALERT DESCRIPTION CODE
- ALL PROBABLE CAUSES CODE POINTS, IN ORDER
- THE DELIMITER X'FFFF'
- ALL USER CAUSES CODE POINTS, IN ORDER, IF ANY ARE PRESENT
- THE DELIMITER X'FFFF'
- ALL INSTALL CAUSES CODE POINTS, IN ORDER, IF ANY ARE PRESENT
- THE DELIMITER X'FFFF'
- ALL FAILURE CAUSES CODE POINTS, IN ORDER, IF ANY ARE PRESENT

STAGE 2: APPLY TO THIS INPUT THE 32 BIT CRC ALGORITHM $$\frac{(X^{**}32)^*I(X) + (X^{**}k)^*L(X)}{G(X)} = Q(X) + \frac{R(X)}{G(X)}$$

WHERE I(X) = THE POLYNOMINAL REPRESENTED BY THE INPUT (WITH THE CONVENTION THAT THE FIRST BIT OF THE INPUT REPRESENTS THE COEFFICIENT OF THIS POLYNOMINAL'S HIGHEST ORDER TERM), L(X) = THE POLYNOMINAL $X^{}31+X^{}30+...+X+1$ (i.e., THE POLYNOMINAL REPRESENTED BY 32 1's), k=THE NUMBER OF BITS IN THE INPUT, AND G(X)=THE GENERATOR POLYNOMINAL $X^{}32+ X^{}26+X^{}23+X^{}22+X^{}16+X^{}12+X^{}11+X^{}10+ X^{}8+X^{}7+X^{}5+X^{}4+X^{}2+X^{}1+1$. THE ALERT ID NUMBER IS DEFINED TO BE THE <u>COMPLEMENT</u> OF THE NUMBER REPRESENTING THE REMAINDER POLYNOMINAL R(X).

FIG. 8D

```
                     ALERT LIST DISPLAY
                                           SYSTEM NAME
RESOURCE
  NAME     TYPE  DATE    TIME    ALERT DESCRIPTION: PROBABLE CAUSE
XXXXXXXX   XXX   mm/dd   hh:mm   xxxxxxxxxxxxxxxxxxxxxx
  PRT01    PRT   02/23   09:23   DEVICE ERROR: PRINTER
  TAPE 1   TAP   01/14   12:20   EQUIPMENT MALFUNCTION: TAPE DRIVE
XXXXXXXX   XXX   mm/dd   hh:mm   xxxxxxxxxxxxxxxxxxxxxx
XXXXXXXX   XXX   mm/dd   hh:mm   xxxxxxxxxxxxxxxxxxxxxx
XXXXXXXX   XXX   mm/dd   hh:mm   xxxxxxxxxxxxxxxxxxxxxx
XXXXXXXX   XXX   mm/dd   hh:mm   xxxxxxxxxxxxxxxxxxxxxx
```

FIG. 10

```
          RECOMMENDED ACTIONS FOR SELECTED ALERT
                                          SYSTEM NAME
   ──RESOURCE HIERARCHY────── RESOURCE NAME (RESOURCE TYPE)
  STLOUIS1(CONTROL POINT)-TAPCTL1(TAPE CONTROLLER)-TAPE1(TAPE DRIVE)

USER CAUSES.........:   TAPE NOT READY
                          DIRTY READ/WRITE HEAD
  ACTIONS.............:   CORRECT THEN RETRY

INSTALL CAUSES......:   NONE

FAILURE CAUSES......:   TAPE DRIVE
                          MEDIA
  ACTIONS.............:   REVIEW ALERT DETAIL
                          PERFORM PROBLEM DETERMINATION PROCEDURES
```

FIG. 11

```
                        ALERT DETAIL
                                        SYSTEM NAME

—RESOURCE HIERARCHY————RESOURCE NAME (RESOURCE TYPE)
STLOUIS1(CONTROL POINT) - TAPCTL1(TAPE CONTROLLER) - TAPE1(TAPE DRIVE)
DATE/TIME (RECORDED)
  DATE.....................:87/01/14
  TIME.....................:12:20:35
DATE/TIME (ORIGINAL)
  DATE.....................:87/01/14
  TIME.....................:12:19:40
ALERT TYPE.................:PERMANENT
DESCRIPTION................:EQUIPMENT MALFUNCTION
PROBABLE CAUSES
  PROBABLE CAUSE 1.........:TAPE DRIVE
  PROBABLE CAUSE 2.........:TAPE
QUALIFIERS
  QUALIFIER 1..............:SYSTEM MESSAGE CODE XXXXXXX
  QUALIFIER 2..............:MESSAGE SEVERITY ZZ
TEXT MESSAGE
  SENDER IDENTIFICATION....:CONTROL PROGRAM
MESSAGE....................:TAPE1 ERROR READING FILE

FLAGS
  OPERATOR GENERATED.......:NO
  HELD ALERT...............:NO
  DELAYED ALERT............:NO
```

FIG. 12

METHOD AND APPARATUS FOR COMMUNICATION NETWORK ALERT MESSAGE CONSTRUCTION

FIELD OF THE INVENTION

This invention relates to data processing and communications systems in general and specifically to network control stations and systems in which problem condition alert signals and messages are defined and sent from operating entities in the network to the network system operator console at the network management control program host.

Prior Art

Alerts in communication and data processing network systems which communicate using alerts to a central operator's console at a controlling CPU station are known. Currently, each alerting product must create and arrange for the storage of product unique screens, identifying an alert condition to an operator, at the problem management console control point. These screens are then invoked when a given alert is received to inform the operator as to what problem or condition is being reported. Substantial effort is involved in developing the product unique screens and in implementing them in a coordinated fashion so that alert screens for each new product attached to a network are available at the control point for display. Furthermore, the amount of storage required to maintain a record of the screens at the control points and the amount of synchronization imposed on the shipment of products by the manufacturers in the creation and distribution of the product unique alert screens for the host system consoles have made this approach highly unacceptable.

In the past, using the so-called stored screen alerts discussed briefly above, an identifying index is specified for each unique alert. Sets of previously agreed-upon display screens were encoded and stored at the operator control console and a unique alert identification was sent with each alert to the operator's console. This enabled the processor at the operator console to identify which screen was being asked for by the alert sender. An alert from an IBM 3274 would, for example, carry a number such as X'08' (hexadecimal). It would also carry an indication that the alert is from a 3274 controller. Based upon this information, the processor at the control console would retrieve and display a set of information display screens for a 3274 and would select from those screens screen number 8 for immediate display. The IBM System/38 implemented such an alert structure as described in IBM Technical Disclosure Bulletin Vol. 26, No. 12 "IBM SYSTEM/38 ALERTS" May 1984.

OBJECTS OF THE INVENTION

In light of the foregoing known problems and difficulties with the prior art, it is an object of this invention to provide an improved generic alert code which reduces the alert screen storage and distribution requirements at the network controlling CPU.

A further object of the invention is to minimize the need for changes to support addition of new products to the network. Yet a further object of the invention is to provide data to be displayed in the language used at the receiving system regardless of the language used at the sending product.

SUMMARY

Code points, which are strings of bits, are generated in response to an event in a device attached to a network. The code points are used to index predefined tables that contain relatively short units of text messages to be used in building an operator's information display. A product attached to a network, an alert sender, generates a series of code points representative of desired display messages for an operator. The messages are independent of the specific alert sending device insofar as an alert receiver is concerned.

The alert receiver, is selected to handle alerts for a number of components on the network. The alert receiver has access to a storage area where display text corresponding to individual code points is stored. When the alert receiver receives an alert, the code points are used as an index by the alert receiver to retrieve messages and build a screen display of data for the operator to review and take appropriate actions.

Code points are assigned in a hierarchical manner so that additional code points can be defined and sent by an alert sending product without the need for changing the code points supported by an alert receiver at the same time. A general or generic error, such as "output device error" is first defined and identified by a code point. More specific errors are then defined, such as "printer error" or "printer cassette error". These detailed errors are given code points which have hierarchically selected different bits. When an alert receiver does not yet have a copy in associated storage of the specific error, the message for the general error is displayed. In the prior art, unless the specific screen was stored at the alert receiver, no such messages were displayed.

One advantage of using code points to build displays of data is that the display can be tailored specifically to describe the event giving rise to the alert. This can be done without storing a large number of displays at the alert receiver. Great flexibility is provided in that the alert sender chooses which short messages to send. The code points are short, so that they do not significantly interfere with transmission of other data on the network. Thus, greater flexibility and granularity is provided without the expense of added storage requirements or transmission bandwidth.

The use of code points also aids in the provision of information to an operator in the language of the operator. The messages may be stored by a receiver in any language desired, as the index will simply retrieve the message at the address indicated by a table of code points and addresses. Thus, alerts for new products do not involve the translation of multiple screen of alerts into many languages. The alerts for new products instead may involve only the translation of a few, if any, unique short messages corresponding to new code points.

BRIEF DESCRIPTION OF THE DRAWINGS

The foregoing and still other unenumerated objects of the invention are met in a preferred embodiment thereof as depicted in the drawings in which:

FIG. 3A illustrates, in order, the selection of data elements from an alert message to be inputted into a buffer prior to entry of the buffer contents into the IEEE 802 standard CRC algorithm calculation device.

FIG. 3C illustrates schematically the basic process flow for generating a unique alert identification number.

FIGS. 6A,6B,6C,6D illustrate in complete detail a specific example of a total generic alert message sent to report a wire fault in the system depicted in FIG. 5.

FIGS. 7,7A,7B,7C,7D illustrate the major vector format to be employed in the standard NMVT messages.

FIGS. 8,8A,8B,8C,8D illustrate one of the subvector formats to be employed in the standard NMVT messages.

FIG. 10 illustrates a generic alert list display.

FIG. 11 illustrates a generic alert recommended actions for selected alert display.

FIG. 12 illustrates a generic alert detail display.

DESCRIPTION OF THE PREFERRED EMBODIMENT(S)

Figure 1A:
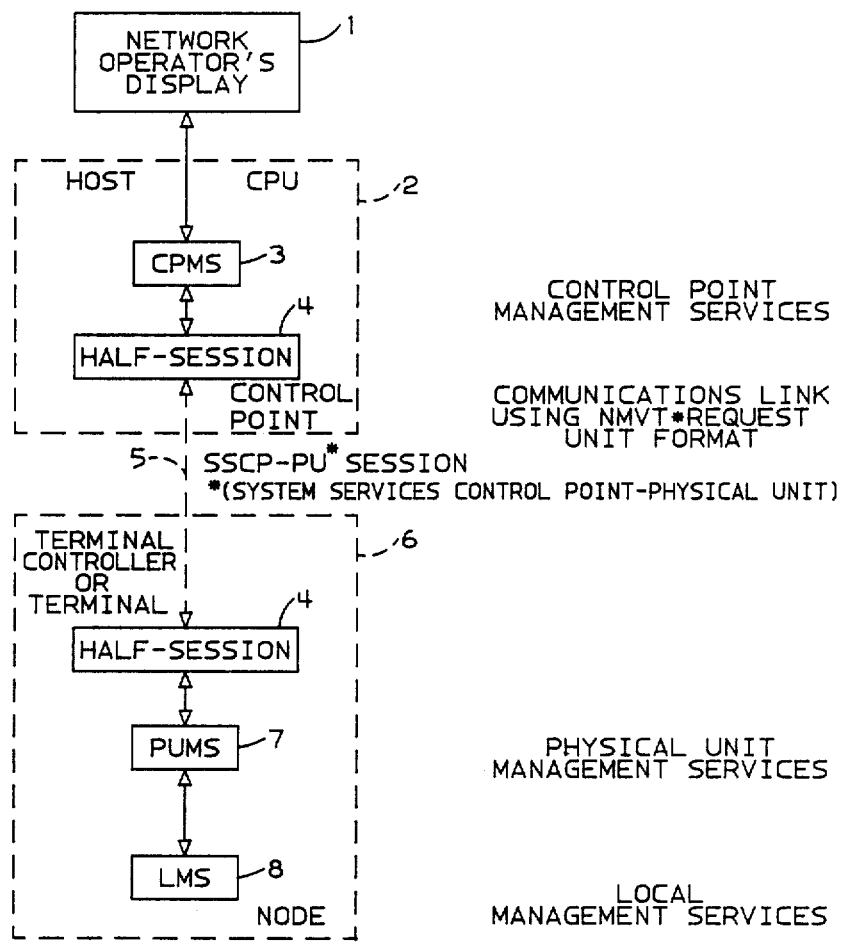
FIG. 1A illustrates schematically an architectural arrangement of the communication and data processing system in an IBM SNA architecturally defined environment.

As alluded to briefly above, the invention finds its application in the present-day complex communication and data processing networks in which a variety of devices or products suffering from a similar variety of inherent possible problems must be managed from central control points by system control operators. In a typical IBM SNA architected system, the network control functions are provided by a variety of management tools and processes. Among these offered in an SNA system are automatic detection, isolation and notification to system operators of existing resource problems. For an overview of such systems, reference may be had to a paper entitled "Problem Detection, Isolation and Notification in Systems Network Architecture" appearing in the Conference Proceedings, IEEE INFOCOM 86, Apr. 19, 1986.

As discussed at greater length in the referenced paper, the strategic vehicle for accomplishing the automatic detection, isolation and notification to the system operator in an SNA network is the Network Management Vector Transport alert. This alert is an architecturally defined and published data communication format with specifically defined contents. Each individual product throughout an SNA network is responsible for detecting its own problem, performing analysis for isolating the problem and for reporting the results of the analysis in alert messages sent to the system control operator. In some cases, a problem may be isolated to a single failing component in the network and the failing component will be identified in the alert message. If the failure can be further isolated, for example, to a specific element within a failing component, then the element may also be identified in the alert message. In other cases where it is not possible for the detecting product to isolate the failure to a network component, the problem detecting product will send information that will assist the network operator at the system control console, or alert receiver, to complete isolation of the failure to a single component. Examples of problems that can be detected are components in an SNA network are given in the aforementioned paper. The data that flows in the alert messages reporting the problems is also specifically described. The IBM program product, Network Problem Determination Application (NPDA) which is an IBM program product that presents alert data to a network operator, is also discussed in brief.

As briefly alluded to, in an SNA network the alert message is the vehicle for notifying the network operator that a problem exists within the network. Products throughout the SNA network are responsible for detecting problems and reporting them via alert messages so that operators at the central control terminal, usually located at the host system site, can be aware of problems in all parts of the network. However, the alert message typically performs more functions than the simple enunciation of the existence of problems. It also transports data that assists the network operators in isolating and in ultimately resolving the identified problems. The alerting task is applicable to all of the resources in the network. Thus, it makes it possible for an operator at the central control facility to manage not only the communications resources of the network such as the controllers, communication links, modems and the like, but also to manage such system resources as tape drive units and Direct Access Stored Data units (DASD) and printers, for example. Typically, such system resource hardware components do not send their own alert messages since they are not provided with the sophisticated problem detection and isolation mechanisms together with processing capability to construct and send the alert messages. Such system resources usually have alerts sent on their behalf by the network component to which they are attached, for example, to an attached controller for a printer, DASD unit, or the like.

As discussed in the aforementioned paper, the alert message is encoded and formatted in an architecturally defined and published manner and is known as the Network Management Vector Transport (NMVT) message when it flows through such a network. As such, the alert message consists of a Major Vector (MV) with an identification that identifies the message as an alert and a number of included Subvectors (SV) that transport the various types of alert data to the control point. The major vector/subvector encoding scheme has several advantages. First, since the format for the message length is variable rather than fixed, an alert with less data than another need not carry 0's or padding characters in unused data fields. If the data to be transported by a given subvector is not present in an alert from a given product, that subvector is simply omitted altogether. Secondly, since products that receive alerts, such as IBM's NPDA product mentioned above, may parse or analyze a major vector and its subvectors, migration to newer versions of the management program products is simplified whenever additional data is added to the alert messages. The new data is simply encoded in a new subvector and the only change necessary to the management program is the addition of recognition support for the new subvector.

In the context of such alert message management systems, an important feature alluded to previously is the filtering of alerts. Filtering is defined as a procedure in which certain message units or specific alerts are selected for exclusion or for different treatment at the alert receiving station, i.e., at the network control console operator's display. Differences in treatment for specific alert messages may be as follows:

The specific alert message may be excluded from an alert log and/or from the alert display at the operator's station. Ordinarily, each alert is logged and presented to the operator as it arrives. Filters may be set, however, to specify that a particular alert should be logged only for later retrieval but not displayed for the operator immediately or perhaps not even logged. The filtering operation for particular alerts allows enablement or inhibition of the functions of logging an individual alert, displaying the alert to a specified operator, forwarding the alert to another control point for handling, or of the use of the alert as a trigger mechanism for the displaying of special display screens in place of those normally used at the control console station. Alert messages that a given user deems useless for a particular network can be discarded altogether while others can be routed first to the appropriate node or station within the network and then to the appropriate operator at that node for handling.

For certain network configurations or user installations, a particular alert message may never be useful. In such cases, a filter can be permanently set at the alert receiver console to discard without logging or displaying them any instances when that alert message is received. Additionally, there may be certain exceptional circumstances, typically such as scheduled maintenance intervals, in which the alert that is generated is ordinarily useful and meaningful but is temporarily of no value. In this case, the filter may be temporarily set to discard any instances of the alert that are received during the maintenance period. The filtering capability is especially important because, for certain types of maintenance procedures, numerous instances of the same alert can be generated in a very short period of time.

As alluded to above, the current implementation of alert messages is based upon product unique screens which are stored at the control point operator's station which is typically connected to a host or in a network control console processor. However, considerable effort is involved in developing the unique screens and in synchronizing their usage with the implementation of given products in a network composed of numerous products from numerous suppliers. Generic alerts, using code points to index short units of text, provide a more flexible approach to the transport and display of information in message alerts to the control point or system control operator's station. In generic alerts, the data can be transported in a coded form within an alert message and the network control point product, such as IBM's NPDA can use the coded data in at least two ways. First, the coded data is used as an index to predefine tables containing short units of text to be used in building the display for the operator. Secondly, the textual data to be displayed can be defined by the alert data itself. In each case, however, the data displayed is wholly independent of the product associated with the cause of the specific alert insofar as the processing of the received message is concerned. The indexing of text strings by the specifically defined and encoded code points contained within the string and the displaying of textual data messages sent in such an alert are done in exactly the same manner regardless of which product caused the sending of the alert.

Figure 2:
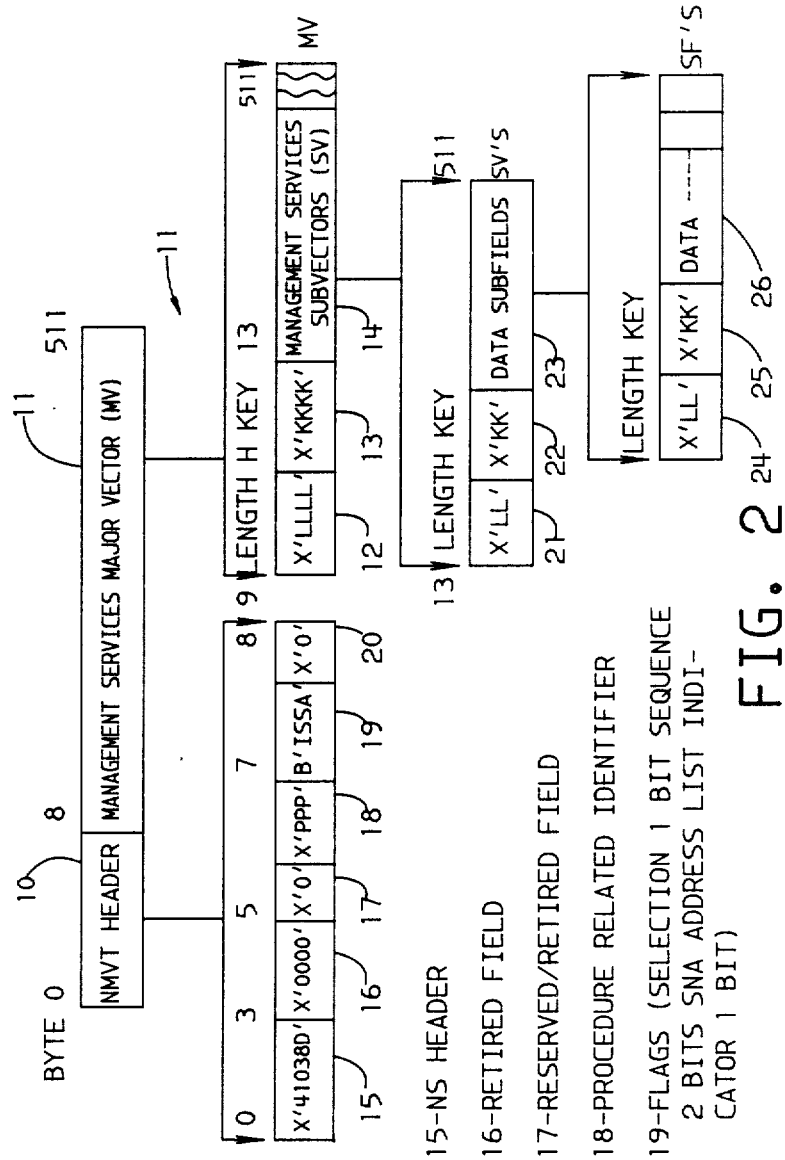
FIG. 2 illustrates the format for the architecturally defined Network Management Vector Transport request unit employed in the preferred embodiment for communication of the alert messages.

As stated earlier, generic alerts in the present invention are encoded in the architecturally defined and published major vector/subvector/subfield format. This format is schematically illustrated in FIG. 2 and is defined in the IBM publication GA27-3136, first published in 1977. The latest versions of this publication which is available in the patent application file contain completely detailed lists of currently defined code points for each specific type of error for each specific type of product in a communication and data processing network. Such detailed lists are not required for an understanding of the operation and best mode of the invention. Instead, the location of the code points and a few examples are provided so that so that one skilled in the art after reading this description would be able to practice it without undue experimentation. The use of the architecturally defined format, unlike fixed format schemes, makes possible the inclusion in a particular alert message of only those elements that are necessary. Subvectors and subfields of data that are not required are simply not included. The encoding scheme as published and defined is currently in use for most SNA management services records in the IBM systems.

Figure 1B:
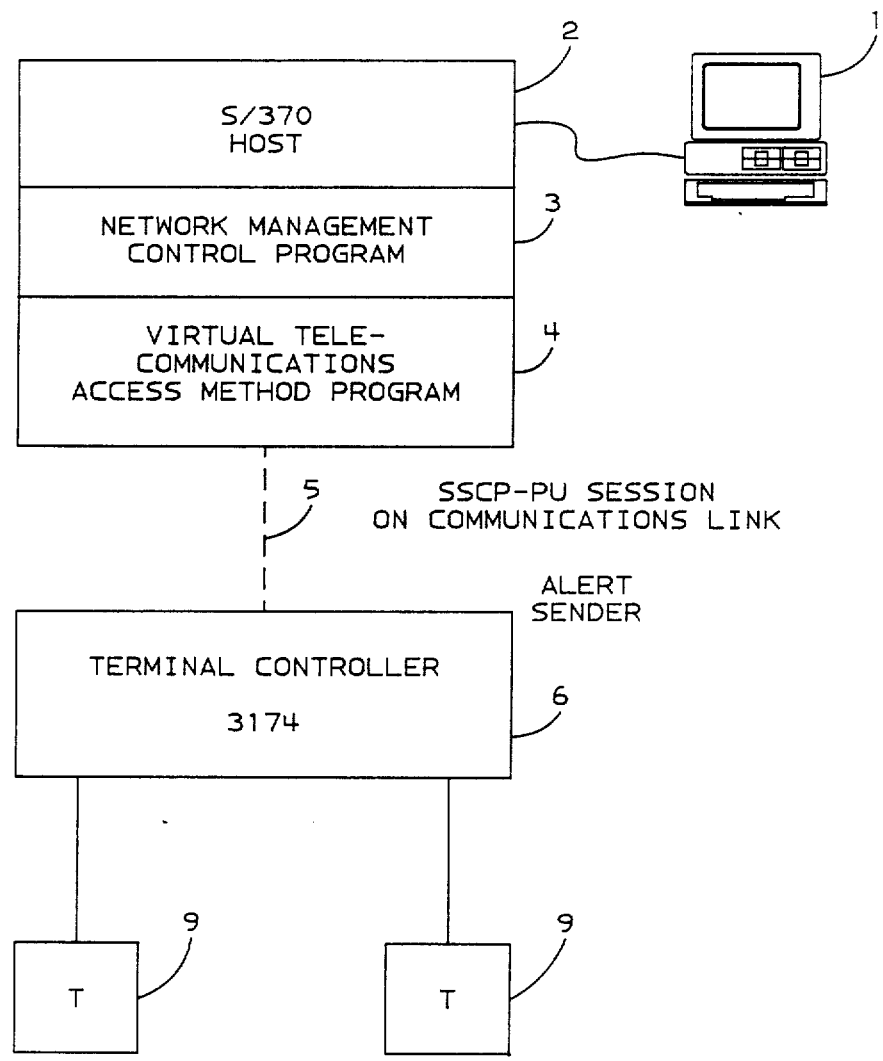
FIG. 1B schematically illustrates a preferred embodiment of the invention environment for an IBM System 370 host operating as the network management control point for communication to an SNA-based communication network.

FIG. 1A illustrates a typical architectural environment for an SNA data and communication network. Typically, the operator's display console indicated as box 1 in FIG. 1A is connected to a host CPU 2 which operates a control point management service program illustrated as CPMS 3 which communicates with session control program 4 internally in the host CPU 2. The session control program 4 operates using the Network Management Vector Transport response unit format over the communications link 5 to establish the SSCP-PU (System Services Control Point-Physical Unit) SNA session. The physical unit (PU) may typically be a terminal controller or a terminal itself if the terminal is provided with sufficient processing capacity. The terminal controller or terminal will contain the SNA session control program portion 4 necessary to establish the partner SNA half session as illustrated in FIG. 1A. The terminal controller or terminal itself 6, as shown in FIG. 1A, will also contain a processor (not shown) operating a management services program for the physical unit itself. This is illustrated as the physical unit management services program block 7 which communicates with local management services program 8 to manage a given terminal or controller. For the architected system of FIG. 1A, the typical physical example is given by FIG. 1B. The operator's console 1, which may be a typical 3270 display station and keyboard, is connected to a System/370 host CPU 2 containing the appropriate control point management services program 3 in the form of IBM's network management control program offering NPDA or other similar versions of network management control programs. The SNA session control is managed by a virtual telecommunications access method such as IBM's VTAM program also operating within the System/370 host. The communications link 5 links the host to a plurality of elements in the communication network. Only one element, a typical IBM 3174 terminal controller is illustrated as the physical unit 6 which contains the necessary programming to support the SNA session, (illustrated as the half session control program portion 4 in FIG. 1A), the physical unit management services program 7 and the local management services program 8 for operating the attached terminals 9 and for reporting problem alert conditions relative either to the terminal controller 6 or to the terminals 9.

The communications link 5 typically links the controller 6 to the host 2 and, of course, numerous such controllers and terminals may exist within a typical complex network.

An architecturally defined and published format for the communication is the Network Management Vector Transport (NMVT) request unit format shown in some detail in FIG. 2. This format is used for the communications of alert messages.

Briefly, the NMVT request unit format comprises a header portion of information 10 followed by the management services major vector portion 11. The total NMVT request unit may contain up to 511 bytes of information and so has a highly variable length and data content. As schematically shown, the NMVT header 10 contains a plurality of subfields of information with bytes 0 through 2 comprising a portion identified as the NS header. Bytes 3 and 4 comprise a field of information that has been retired from use identified as field 16. Field 17 comprising bytes 5 is reserved or retired and field 18 is a procedure related identifier. Bytes 7 and 8 represent data fields 19 and 20 with field 19 being for indicator flags' sequence field, and SNA address list indicators as shown in the drawing. Field 20 is a reserved field.

The management services major vector portion 11, may be further broken down into fields 12 through 14 as schematically depicted in FIG. 2. A length indicator comprising bytes 9 and 10 contains a pointer pointing to the end point of field 14. A key indicator comprising bytes 11 and 12 specifies the particular type of major vector as will be further described. The management services subvector field 14 may contain a plurality of bytes of data specifically selected to represent the problem conditions to be reported. The specific selection is in accordance the defined specification previously noted in the IBM SNA reference manual.

The management services subvector field 14 may be further broken down into specific subvectors, each of which may be identified by fields 21 and 22 as having a specific length and a specific type with the data field 23 containing specific subfields of data. The data subfield 23 may be further broken down into subfields within the data each having a length field 24, an identification key field 25 and subsequent data fields 26.

As may be readily appreciated, a high degree of flexibility of encoding data points to construct an alert message is made possible in this system. However, it will be noted that the alert messages constructed in this format contain no unique fixed length identifier to describe to the receiving management for operator console which specific alert has been encoded.

The specific solution to this problem, is more fully described in U.S. Pat. No. 4,823,345 for Method and Apparatus for Communication Network Alert Record Identification, filed on the same date herewith, and having attorney docket number RA987-001. The above solution is depicted schematically in FIG. 3C as a two-stage process for generating a unique alert identification number. As depicted in FIG. 3C from a generated alert message record, certain fields of data are extracted as an input to the CRC algorithm. The alert record 28 is inputted to the extraction means 29 which is a selector routine that selects from the NMVT formatted message certain prescribed bytes from identified subvectors as will be described in greater detail later. This creates input to the CRC algorithm for calculation in box 30. The IEEE 802 standard CRC algorithm is well known but is set out later herein for convenience. The result of calculating this algorithm utilizing the data input from box 29 is a 32-bit number to which is appended in box 31 a unique product identification code which results in an output of an alert message identifier.

FIG. 3C shows the format of an outputted alert identifier unique to a specific product and alert message.

FIG. 3A describes in tabular form the necessary fields to be extracted from the NMVT formatted message. The elements to be extracted constitute those fields representing the alert type 301 from the hex 92 subvector in the NMVT, the alert description code 302 from the hex 92 subvector and all probable cause code points 303 in their order of appearance from the hex 93 subvector. This is to be followed in order by a delimiter 304 as specified in FIG. 3A, all the user cause code points 305 in their order of appearance from the hex 94 subvector (this subvector is optional and may be omitted), a further delimiter 306 as shown in FIG. 3A and any install cause code points 307 in their order of appearance, if any, from the hex 95 subvector. This is also followed by a further delimiter 308 as shown in FIG. 3A and finally, by all the failure cause codes points 309 as defined in order, if any, from the hex 96 subvector. This subvector is also optional as is the hex 95 subvector as noted in FIG. 3A. All of these code points for subvectors 92 through 96 are completely architected and described in the aforementioned IBM SNA reference manual.

Figure 3B:
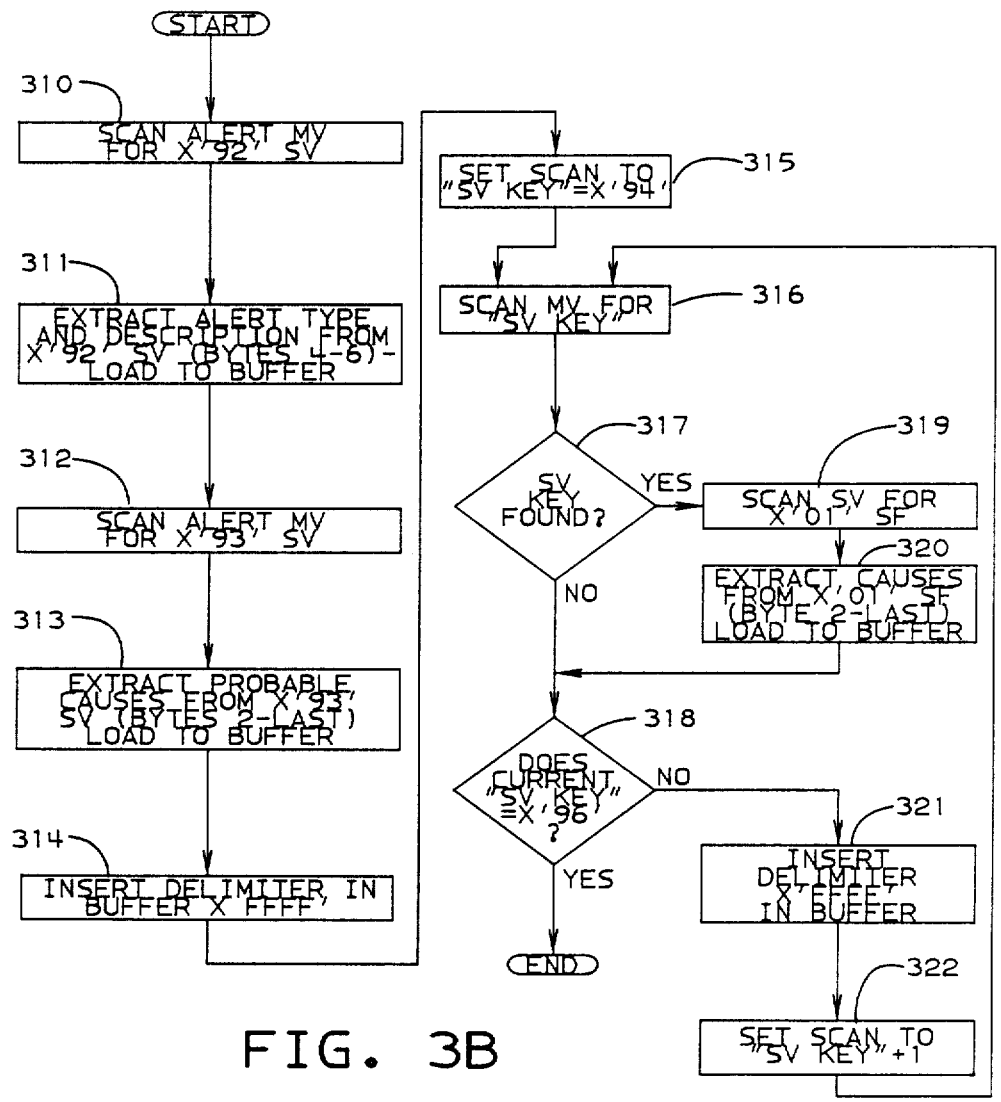
FIG. 3B illustrates schematically a program for generating a unique alert identification number.

The procedure as depicted schematically in the flow chart in FIG. 3B operates as follows:

First, the elements of the alert record to be used in filtering are extracted from the subvectors at 301 and 311 and at 312 and 313 as specified in FIG. 3A and placed into a variable length buffer in the specified order depicted in FIG. 3A. Delimiters at 314 are inserted to distinguish successive groups of elements from each other (the delimiters as shown in FIG. 3A). This process is done for major vectors at 301 through 314 and for subvectors at 315 through 322. Note that for subvectors a variable "SV KEY" is used for the scan, and incremented at 322. The result of this step is a mapping of alert elements into the buffer entries (such as in FIG. 4) in such a way that two independent alerts from different sources will constitute an identical buffer entry if, and only if, they should be treated as indistinguishable for filtering purposes. Next, turning to FIG. 3C, the buffer entry is run as a data input into a specified IEEE 802 standard CRC algorithm calculation device. The device may be either a commercially available CRC algorithm integrated circuit chip which calculates the result or it may be an appropriately programmed data processor. The output which results from the CRC algorithm calculation is a 32-bit binary number that is associated with the buffer entry. This number is inserted in the alert itself, so that it will be available to the alert receiver.

There are actually two different methods by which the first two steps indicated above can be implemented. An alert sending product may actually implement the CRC algorithm in its own processor or in its own code and generate the alert identification number for each alert on-line in real time as it is prepared for transmission. Alternatively, the alert sending product may be pre-coded with predefined alert ID numbers with the code points having been run through the algorithm generation process once in the course of product development. The resulting ID numbers can then be stored in the table within the product so that only a table look-up is necessary at the time it is necessary for sending a specific alert.

When it receives an alert, an alert receiver extracts two pieces of information from it: the identifier indicating the identity of the network product which sent the alert, and the 32-bit number resulting from step 2 above. The identifier, identifying the sending product, appears in the architecturally defined portion reserved for this purpose. These two are concatenated together to form the unique alert identifier depicted in FIG. 3C. The purpose of this step in the process is to reduce the probability of duplication of the unique identifiers from the mapping that is done in step 2. Since the buffer entries for alerts are always at least 5 bytes in length and typically may range from 15 to 25 bytes and perhaps may be as large as 80 bytes or more, the mapping of the entries into a 32-bit number is obviously not a perfect one-for-one mapping. By concatenation of the resulting 32-bit number with the identity of the sending product, the probability of duplication is enormously reduced since the set of all alerts flowing in a given network which may easily run into thousands of alerts will be partitioned in the sets associated with alert sending products in the network which typically are many fewer and may range between 10 and a few hundred. Therefore, the likelihood of duplication of the same alert message occurring from the same type of product at the same time for application to the network is very small.

Figure 4:
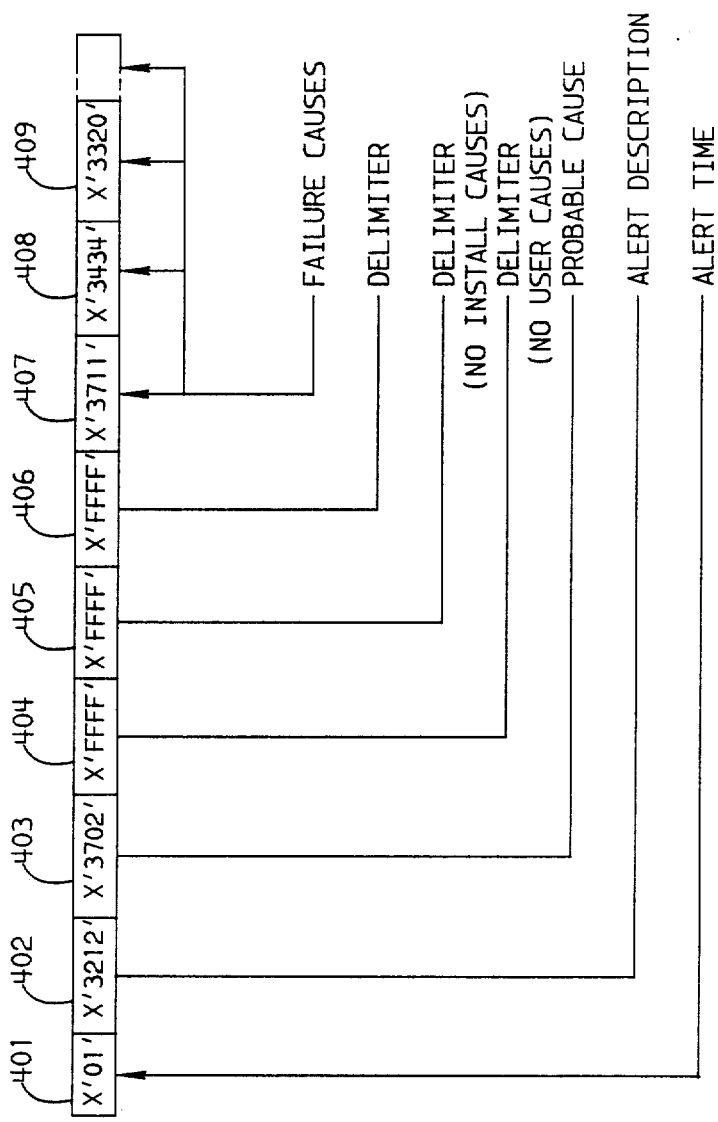
FIG. 4 illustrates schematically the buffer content for a specific example of an alert message.

The buffer entries are always ordered in accordance with the hex subvectors 92 through 96 keys as depicted in FIG. 3A in accordance with this invention. The specific example for a specific type of product under specific assumed conditions is depicted in FIG. 4 where the buffer entries are shown in the order of their presentation at 401, 402, 403, 404, 405, 406, 407, 408 and 409. As the example indicates, the code entries that are placed in the buffer comprise only a small portion of the complete alert record given in FIG. 6 for the sample assumed condition. Only the code points that are characteristic of a particular alert condition have been selected in accordance with FIG. 3A. Other elements of the alert record, such as the time stamp, the sender's serial number, the SNA name or address, etc., that may differ for the same alert condition in the network are not included in the alert ID number calculation process.

Figure 5:
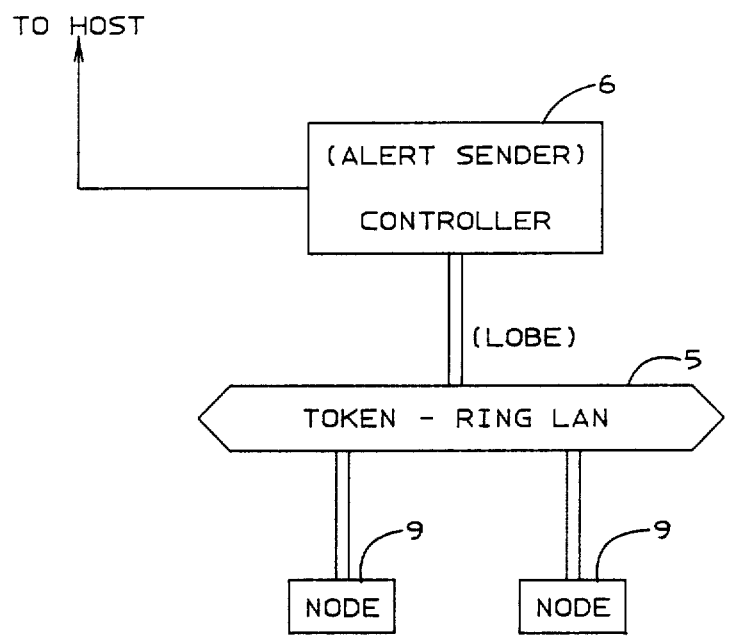
FIG. 5 illustrates schematically a portion of a typical communication/data processing network configuration in which a communication controller attached to a token ring network operates as the alert sender.

Turning to FIG. 5, a portion of a typical communications network in which the alert sender 6 is a token ring controller connected to a lobe of a token ring communication loop 5 and connected to individual terminals or work stations 9 is shown. The specific example assumed is that the alert sender 6 detects a wire fault in the token ring lobe 5 which is to be reported. FIG. 6, comprising FIG. 6A through 6C show the entire NMVT generic alert message that is constructed by the controller 6 to report a wire fault. The elements of the alert that are employed in the alert identification number calculation for input to the CRC algorithm are indicated in the figure. It may be noted that the entire alert message constitutes a message of 132 bytes length and that the individual bytes and bits having the specified hex values have the given meanings as shown in FIG. 6. All of these meanings and byte and bit values are fully defined in the published aforementioned IBM reference. Since the specific assumed example forms no part of the present invention, the full detail of the published reference defining all of the possible code points for types of errors and information to be reported in each case is not duplicated herein. However, for purposes of illustration, portions of the generic alert data X'92' alert subvector from the aforementioned reference are set out in FIGS. 7 and 8. It may be noted that the X'92' subvector has an encoding scheme in which X'1xxx' is reserved for hardware-related code point descriptions. A complete list of hardware-defined malfunction codes specifically identifies the nature of error and a variety of condition reports such as loss of electrical power, cooling, heating, etc.

Byte 0 of this subvector X'92' is the length pointer which contains, in binary form, a length pointer defining the length of the message. Byte 1 represents the key identifier encoded with the X'92' to identify this subvector as the hex subvector 92. Bytes 2 through 3 are flags in which bits 0 and bit 1 and bit 2 only are used as shown. Byte 4 is the alert type code which is a code point indicating the severity of the alert condition being reported. Five currently defined code points are used in this byte, although obviously many others are possible within the limitations of a single byte of data.

GENERIC ALERT CODE POINTS

The alert type code point indexes predetermined text, which defines the severity of the problem. Possible values which can be defined are chosen from the following list:

1. Permanent

This is defined to be a loss of availability to the end user that cannot be recovered form without intervention from the focal point operator.

2. Temporary

This is defined to be a momentary loss of availability that will probably be noticed by the end user, but can be recovered from without intervention by the focal point operator.

3. Performance

Performance is below that which is considered to be an acceptable level.

4. Impending Problem

This is defined to be a loss of availability to the end user that is impending, but which has not yet happened.

5. Unknown

It is impossible to assess the severity of the alert condition.

Bytes 5 and 6 are the alert description code which are code points that provide an indexed predefined text that describes the specific alert condition. Assignment of the code points is by the highest order hexadecimal digit with prefix digits 1 being reserved for hardware, 2 for software, 3 for communications errors, 4 for performance errors, 5 for traffic congestion, 6 for microcode errors, 7 for operator conditions or errors, 8 for specification errors, 9 for intervention conditions, A for problem resolved reports, B for notification, C for security, D (reserved) and E (reserved) for problems of undetermined origin.

The defined codes include specific codes for equipment malfunctions that are further specified to the control unit, or the device, input or output device errors, specific type device errors such as printer error or cassette error, loss of electrical power with specific losses of electrical power to the channel adapter, line adapter, etc., loss of equipment heating or cooling, subsystem failures with specific identification of the failing subsystem, to name but a few of the hardware type errors that may be specified in these codes. Software code points are defined for software program abnormally terminated, or for software program errors. Communication protocol errors are defined in the X'3xxx' codes with SNA protocol errors, LAN errors, wire fault errors, auto removal errors, token ring inoperative reports, etc., being among those reported as well as link errors of various types, connection errors, etc. Performance reports are contained in the X'4xxx' code point and congestion in the system or network components having reached its capacity is reported in the X'5xxx' code point as defined in the aforementioned reference. Microcode program abnormalities and errors are reported in the X'6xxx' code point and operator procedural errors are defined in the X'7' code point. Configuration or customization errors such as generation of parameters that have been specified incorrectly or inconsistent with actual configuration are reported in the X'8xxx' code point. The X'9xxx' operator intervention messages are completely specifiable for a variety of conditions including low ink, low on paper, out of coins, etc. The X'Axxx' code points indicate the problem resolution X'Bxxx' are operator notification code point. X'C' are security event indicator code points. X'D' and X'E'000 through X'E'FFF are reserved.

The remaining bits of the codes define the condition being described. Probable causes of the condition are defined in decreasing order of probability.

User and failure causes are also defined. The probable cause specifies what it is that has failed, while the others specify what is wrong with a probable cause. For example, a probable cause might indicate a particular cable, while a user cause in the same alert may specify that the cable may be unplugged.

For some instances, the alert sender may not be able to define a specific user, failure, or install cause. If none are defined, then the product should send a cause undetermined code point in the alert. The sending product must still define at least one recommended action code point, which will be sent in the alert with the cause undetermined code point.

If there is at least one user, failure, or install cause defined, there must also be an associated recommended action defined for that cause. There may be more than one of each defined. For example, one failure cause may be identified with two associated recommended actions, of vice versa. But, there is no correspondence implied between the cause and recommended actions, i.e., it is not the case that the first cause is associated with the first action, the second cause with the second action, and so on. Rather the two are independent lists, with the causes listed in decreasing order of probability, and the action listed in the order in which they are to be performed by the operator.

Some examples of user causes include, power off, line not enabled, media jam, and incorrect procedure. Install causes include incorrect hardware configuration, mismatch between hardware and microcode, cable installed incorrectly and LAN configuration error. Failure causes include storage, software program, communications error, cable loose or defective, and device. The recommended action code points describe actions that the focal point operator can take to correct the problem that caused the alert or to complete the process of problem determination.

Detail data code points are defined for user, install, or failure causes, and also for the recommended actions. Detail data consists of two pieces of information, a detail data ID, and the actual data itself. There can be up to three detail data qualifiers defined for each piece of information.

For example, if a product sends the following recommended action code point:

Perform Problem Determination Procedure for __Detail data ID__. One detail data qualifier must also be defined. The detail data ID is chosen from a list of appropriate values. The method of inserting the detail data is determined by the alert sender.

Message code points are defined in a hierarchical manner so the additional code points can be defined and sent by an alert sending product without the need for changing the code points supported by an alert receiver at the same time. This is done by grouping as shown in the following example:

X'1100'- Output device error (general error)
X'1101'- Printer error (specific error)
X'1102'- printer cassette error (specific error)

When an alert sender needs a new message code point such as X'1103' for a plotter error, then the code point is added to the architecture and the alert sender can begin using the code point as soon as it is ready. The alert receivers will default to a display of the general error (in this case "Output device error") for all code points that they do not have defined until the update that adds the new code point support.

This is done for multiple levels so that in the preceding example, if a new category analogous to "Output device error" was needed and defined then the default would be to X'1xxx'- Hardware.

FIGS. 6A and 6B indicate the structure of some common subvectors that may be used in generating an alert. FIG. 7 lists the common subvectors that can be used, with information on when they are used.

MESSAGE CODE POINT SELECTION

If the alert sender has only a few failure conditions to report, then the easiest method to select and assemble code points and other data in an alert is to predefine all the code points required for each alert. A table has entries which are complete alerts except for real time data such as a time stamp or sequence number. Entry to the table to select the alert is done based on an error code or message ID which is generated by the device giving rise to an event, or a device associated with such a device.

If the alert sender has many possible alerts that can be sent, then a more sophisticated method of building alerts is required. If the alert sender can identify the possible causes and recommended actions at the time of failure, then each possible cause and recommended action is mapped to the appropriate code point at the time of failure, the alert ID generated and the real time data added to build the alert dynamically. This method has the advantage of eliminating the need to identify each possible alert in advance.

DISPLAY SCREEN GENERATION

Figure 9:
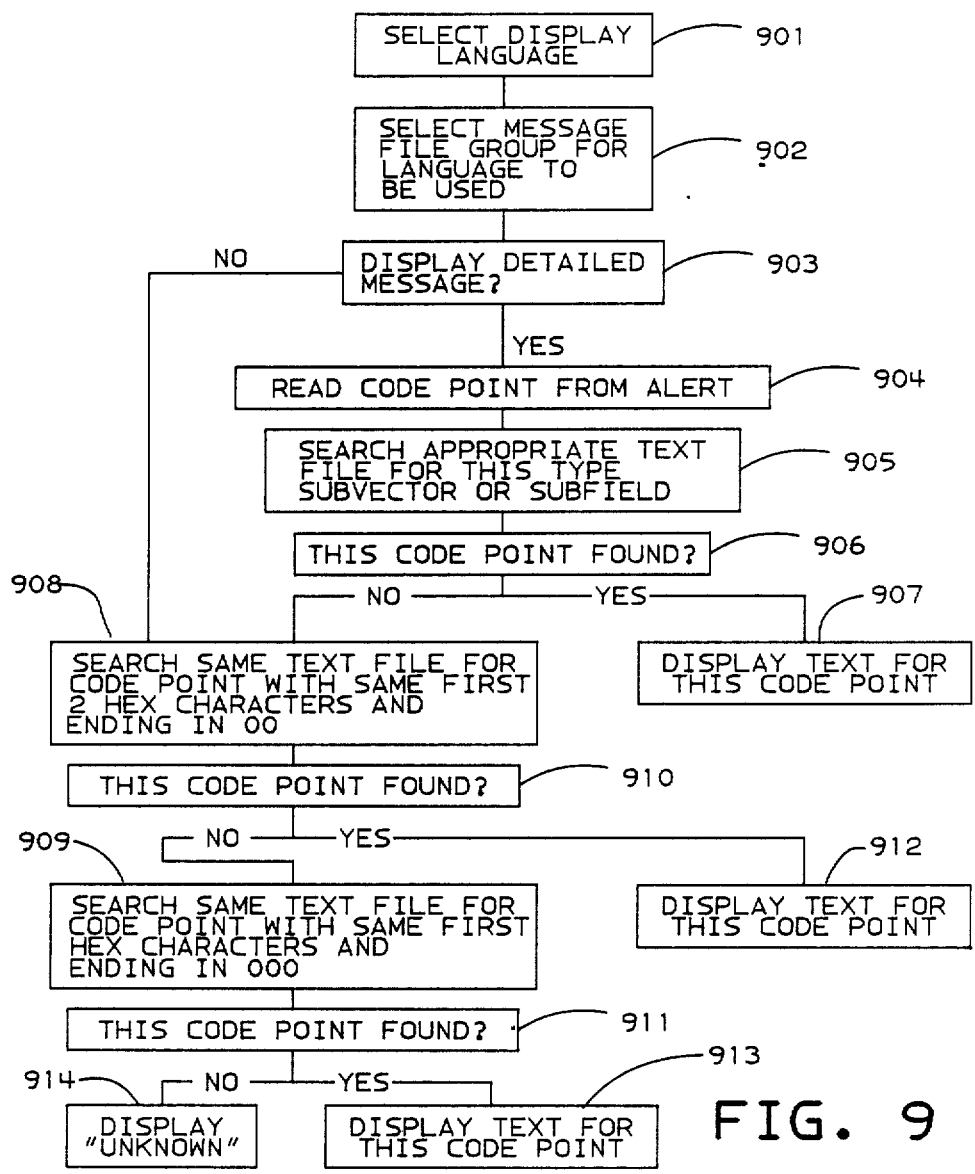
FIG. 9 illustrates a flow diagram for the display of generic alert messages.

A flowchart in FIG. 9, indicates the general operation of the alert receiving product in generating a display for the operator. The alert receiver has already been initialized to search in the language indicated by the operator for the display of alert information at 901. This is done simply by selecting a message file group at 902 to be searched using the code points. Next, the first digit of the code point can be used only to select simpler text at 903 than that which is available. A code point is read from the alert at 904. If an unsophisticated user desires to view an alert, only the first two hex characters are used to generate the alert. Thus, the message displayed is fairly simple. In the case of an operator desiring a detailed alert screen, a search at 905 is made for text corresponding to the entire code point. If text is found at 906, it is displayed at 907. If text is not found, further searches at 908 and 909 are done on fewer and fewer first hex characters with the last hex characters ending in 0's until text is found at 910 or 911 and displayed at 912 or 913. If no text is found "UNKNOWN" is displayed at 914.

An example of an alert list display generated from generic alerts in shown in FIG. 10. The alert receiver uses the code points in the alert to retrieve the appropriate text strings. These text strings are then used together with four to five defined screen formats to dynamically build the display screens which are presented to the network (focal point) operator. The alert list screen displays a list of received alerts by extracting the sender ID, hierarchy type, description, and first probable cause for each received alert and displaying them using the alert list screen format. Each record in the list provides a resource name identifying the alerted (failing resource, a resource type which identifies the type of the failing resource, a date/time that the alert was received and logged by the alert receiver, an alert description which is translated from the alert description code point in the received alert by the alert receiver, and a probable cause. Only the most likely probable cause is displayed on the initial list display.

FIG. 11 shows an example of a recommended actions display screen created from the detailed cause and recommended actions code points in the alert. This screen shows the resource hierarchy which indicates the elements that provide the connection to the failing resource. In this example, the failing resource, TAPE1, is connected via a tape controller and the system (control point) to which the controller is attached. Also included is user/install/failure causes and recommended actions text which are derived from the code points in the alert.

A detail alert display to display other data in the alert is shown in FIG. 12. This display includes the following pieces of information:

1. Resource Hierarchy. This is the same hierarchy displayed on the recommended actions screen.
2. Date/Time. There are 2 date/time stamps. The first date/time is the time that the alert was logged by the alert receiver. This is the same date and time that appears on the first panel. The second date and time is the date/time that the alert was created at the originating node, and most accurately reflects the time that the alertable condition was detected.
3. Alert type. This information is the same information found on the original list display as described above.
4. Probable causes. There can be multiple probable causes displayed on the alert detail screen, depending on the number of these code points in the alert. They are displayed in decreasing order of probability, assuming that they were properly defined to reflect this. The first probable cause is the same one displayed on the initial list display.
5. Qualifiers. Each qualifier name is translated from a code point in the alert. The qualifier describes a unit of detailed data which provides information on the problem. Qualifiers are associated with causes or recommended actions.
6. Text Message. This can optionally be provided by the alert sender. The text message is not translated and is for supplemental use only.
7. Flags. The flag field provides information about the alert that is provided by the alert sender. For example, one flag is used to identify that the alert was held at the originating node, that is, it was not sent immediately when the condition was detected.
8. Resource Hardware ID. This is the hardware information for the alerted (failing) resource.
9. Sender Hardware ID. This hardware information is for the alert sender.
10. Sender software ID. This software information is for the alert sender. The Common level section displays the following information: Version identifier, release identifier, modification level identifier.
11. Unique Alert ID. The unique alert ID is generated by the alert sender by concatenating the product ID for the alerted resource with a number which is generated by applying an architected algorithm to architecturally defined sections of the alert.

Finally, bytes 7 through 10 are the alert ID number itself, which is the 4-byte hexadecimal value computed in accordance with the instruction as set out in the Figures. The alert ID number is defined for this invention to be the number representing the remainder in the polynomial field R(X) resulting from the CRC generation algorithm of the IEEE 802 standard. To the alert ID number is concatenated the product ID from hex subvector 11.

In similar fashion, although not set out herein at all, the hex subvector 93 through 96 contents are completely defined for each possible code point in the aforementioned reference. It is from these subvectors that, in accordance with the instruction depicted in FIG. 3A, specific fields or code points are extracted for input to the CRC generation algorithm.

As will be apparent from FIG. 6, it is an extremely simple proposition to construct a buffer entry as shown in FIG. 4 from the input alert message All that is required is to search the alert message string until the X'92' generic alert data subvector key is found, scan the bytes in the X'92' subvector, extracting codes for the alert type (found at byte 78 in FIG. 6) and for the alert description code (found at byte 78 and 79 following the alert type). Next, the probable causes subvector X'93' is searched for and found at byte 86 whereupon scanning for the identified probable cause at the next bytes 87 and 88 yields an encoded probable cause code point. A delimiter X'FFFF' is then inserted from a fixed register in accordance with the format shown in FIG. 3A and will appear as shown in FIG. 4. The delimiter X'FFFF' is inserted again. Next, it is necessary to search for the hex subvector 94 for any encoded user causes. In the case illustrated in FIG. 6, there are no encoded user causes so hex subvector 94 does not appear in the message. Next, a search is made for the install causes in hex subvector 95 which similarly is not present in FIG. 6 since in the assumed example, no install causes are encoded. The delimiter X'FFFF' is inserted a third time. Finally, failure cause code points from the hex subvector 96 are sought. These are found beginning at byte 90 in FIG. 6 and the specific encoded causes are found at bytes 93-94, 95-96, and 97-98, which identify in order that the local access unit is the cause, that it is the local lobe cables at the access unit and that it is the local token ring adapter which may be involved.

The Network Management Vector Transport Alert major vector format is illustrated in FIG. 7 and shows the order of assembly for the alert major vector depicted schematically in FIG. 2. As is apparent from FIG. 7, the generic alert data appears in hex subvector 92 and is present at each occurrence of the alert major vector. Probable causes will be encoded at a hex subvector 93, the user causes will appear at subvector 94, etc. The format for the location of information within each hex subvector is fully defined as shown by the example given for the X'92' alert subvector previously discussed. The alert type will be found at byte 4 within the X'92' subvector, the alert description code at bytes 5 and 6. In the example shown in FIG. 6, the X'92' subvector actually begins at byte 74 with the generic alert data subvector length indicator followed, at byte 75, by the second byte within the subvector, which is the subvector key identifier for X'92'. The alert type is therefore found at byte 78, the fourth byte from the beginning, and the alert description code is found at bytes 79-80, the fifth and sixth bytes, respectively, from the beginning of this subvector. The formats for the hex subvectors 93, 94, 95, 96, which are necessary for building the input to the buffer for eventual input into the CRC algorithm calculator are thus rigidly prescribed in advance.

As is evident from the foregoing, the use of the IEEE standard 802 CRC algorithm results in a standard 32-bit binary output which may be appended to the product ID code to provide a unique alert message identifying indicator which can be used for all of the valuable filtering functions alluded to earlier and which avoids the necessity of generating individual descriptor screens for each product and for each type of failure for that product in a coordinated fashion to be communicated between the host network management control program facility and the user. Instead, the users may select descriptive alert condition codes from the published all inclusive lists thereof for transmission to the host system. These unique identifiers may be generated in advance and stored in a tabular form for look-up when specific error conditions are detected by the alert sender. This avoids the step of actually calculating the CRC algorithm result each time.

Having thus described our invention with reference to a preferred embodiment thereof, it will be apparent to those skilled in the art that numerous departures in implementation may be made without affecting the basic concept of utilizing code points to identify short strings of text. The code points may also be used to give graphical representations of an event as well as to identify other forms of communications. Therefore, what is contained in the claims below is by way of description and not by way of limitation.

What is claimed is:

1. An event notification device for a communication network wherein there exist a plurality of types of events of which notification is provided, the notification device comprising:
    means for receiving a plurality of code points associated with an event;
    an index for cross referencing said code points to units of text corresponding to said code points;
    text providing means coupled to the means for receiving said code points, for utilizing said index to provide said units of text; and
    display means coupled to said text providing means for combining said units of text to form a display describing the event with which said code points are associated.

2. The event notification device of claim 1 wherein said code points are hierarchically organized into at least two levels of specificity of corresponding units of text.

3. The event notification device of claim 2, further comprising:
    means for determining when the index does not contain a unit of text corresponding to a received code point;
    means for determining the unit of text at a lower level of specificity than the received code point which is both descriptive of the detected event and at a higher level of specificity than any other unit of text descriptive of the detected event; and
    means for substituting said unit of text at a lower level of specificity for the unit of text that would have corresponded to the received code point in the event the index does not contain a unit of text corresponding to the received code point, coupled to said means for determining when the index does not contain a unit of text and to said means for determining the unit of text at a lower level.

4. The event notification device of claim 1 wherein said index contains the units of text in at least two languages, the device further comprising:
    language selection means coupled to the index for selecting the language of the text description of the event to be displayed by the display means.

5. The event notification device of claim 1 wherein said index contains the units of text in at least two levels of descriptiveness, the device further comprising:
    level of descriptiveness selection means coupled to the index for selecting a level of text descriptive of the event to be displayed by the display means.

6. The event notification device of claim 1 wherein said display means further comprises screen template means for defining the layout of the text on the display screen.

7. A method of an alert receiver displaying event alerts in a communication network having a plurality of event generating products coupled thereto, wherein there exist a plurality of types of event alerts which are displayed, the method comprising the steps of:
    receiving a plurality of code points via said network which reference strings of text and which are associated with an event;
    retrieving said strings of text from storage locations indexed by said code points;
    combining said strings of text to from a message describing the event with which said code points are associated; and
    displaying said message to an operator.

8. The method of claim 7 wherein said code points and strings of text comprise a common set of text for use by all event generating products.

9. The method of claim 7 and further comprising the steps of:
    selecting a language for display of the text; and
    initializing the alert receiver for the selected language so that said text is displayed in said language.

10. An event notification device for a multiproduct communications network wherein at least some of the products connected to the network provide indications of events, and wherein there exist a plurality of types of events of which notification is provided, the notification device comprising:
    means for detecting an event in a product connected to the network;
    means for generating a plurality of code points associated with generic units of text which are representative of the detected event coupled to said means for detecting an event; and
    means for combining said code points to form an alert which identifies the generic units of text which describe the detected event.

11. The event notification device of claim 10 wherein said code points are hierarchically organized into at least two levels of specificity of corresponding units of text.

12. The event notification device of claim 10 and further comprising:
    language selection means coupled to the means for combining code points for inserting language selection information into the alert.

13. The event notification device of claim 10 wherein said alert contains code points which refer to units of text comprising:
    probable cause of the event units of text; and
    failure cause units of text arranged in order of probability.

14. The event modification device of claim 10 wherein the means for combining code points combines them in a format comprising major vectors and subvectors.

* * * * *

UNITED STATES PATENT AND TRADEMARK OFFICE
CERTIFICATE OF CORRECTION

PATENT NO. : 4,965,772

DATED : October 23, 1990

INVENTOR(S) : Arthur A. Daniel et al

It is certified that error appears in the above-identified patent and that said Letters Patent is hereby corrected as shown below:

On the title page, item [75], to correct the spelling of an inventor's name:

Change "Slevenson" to --Stevenson--.

On the title page, item [75], to correct the spelling of an inventor's name:

Change "Meeham" to --Meehan--.

UNITED STATES PATENT AND TRADEMARK OFFICE
CERTIFICATE OF CORRECTION

PATENT NO. : 4,965,772

DATED : October 23, 1990

INVENTOR(S) : Arthur A. Daniel et al.

It is certified that error appears in the above-identified patent and that said Letters Patent is hereby corrected as shown below:

Column 16, claim 4, line 5,

Delete "description" and substitute therefor --descriptive--.

Signed and Sealed this

Seventh Day of April, 1992

Attest:

HARRY F. MANBECK, JR.

*Attesting Officer*      *Commissioner of Patents and Trademarks*